Nov. 10, 1959

E. D. BEACHLER ET AL 2,912,629

AUXILIARY DRIVE CONTROL

Filed Dec. 18, 1956

Inventors
EDWARD D. BEACHLER
EDGAR J. JUSTUS

By

Attys

Nov. 10, 1959 E. D. BEACHLER ET AL 2,912,629
AUXILIARY DRIVE CONTROL
Filed Dec. 18, 1956 4 Sheets-Sheet 2
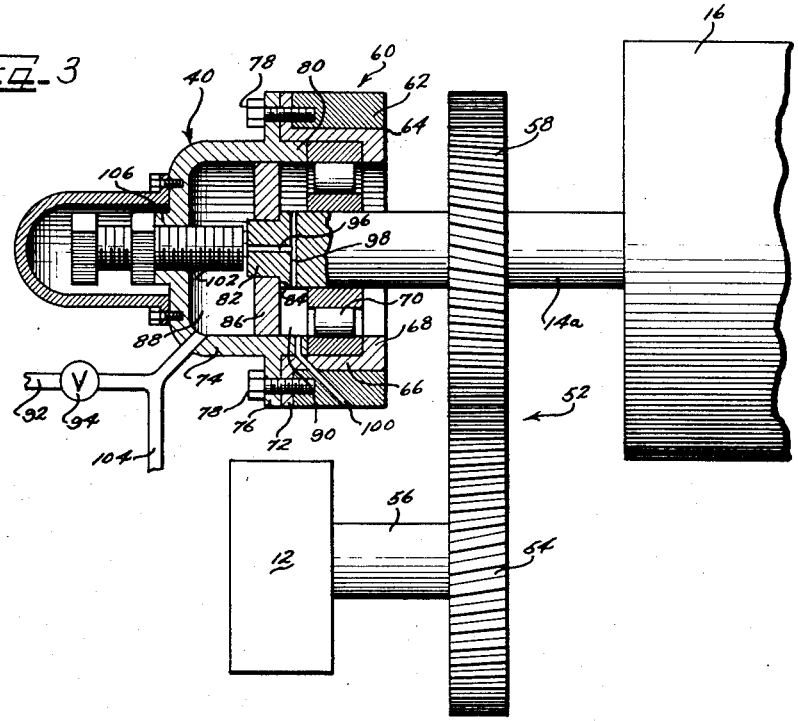
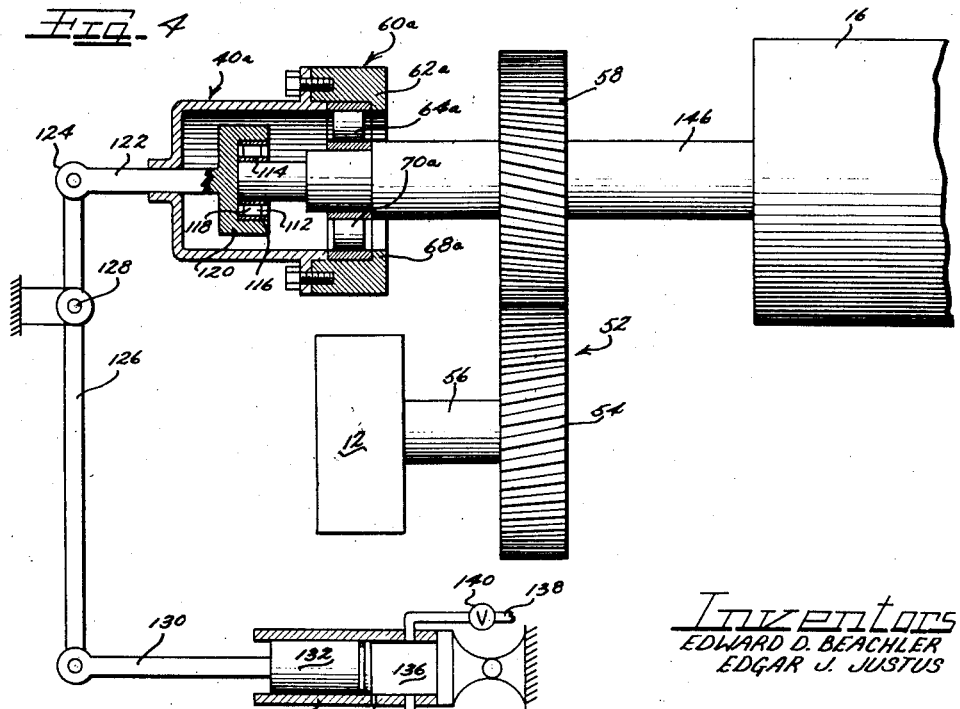
Inventors
EDWARD D. BEACHLER
EDGAR J. JUSTUS

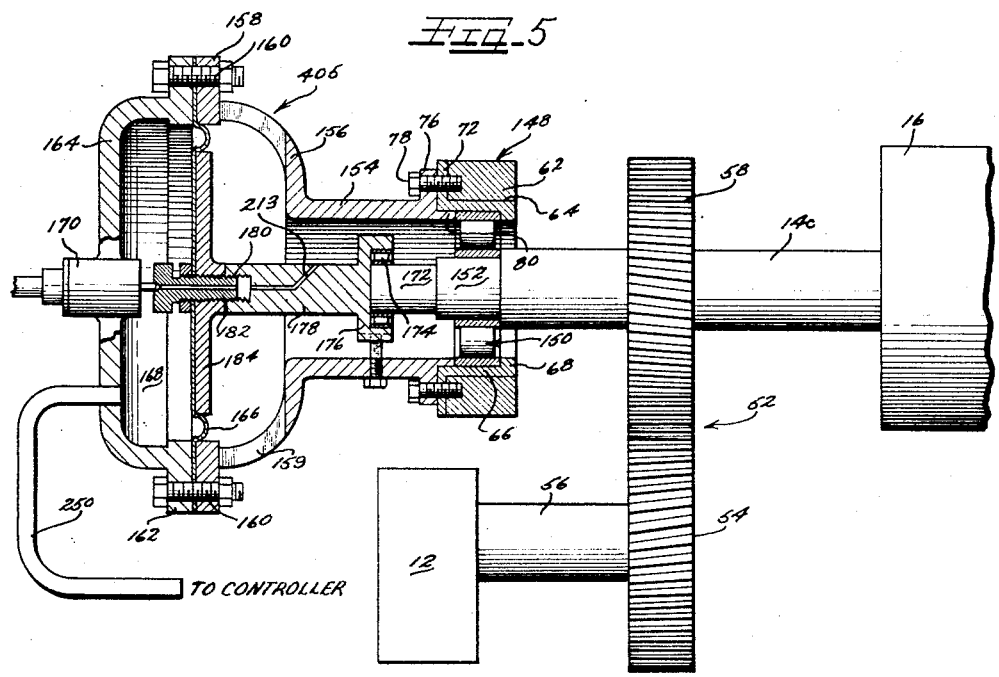
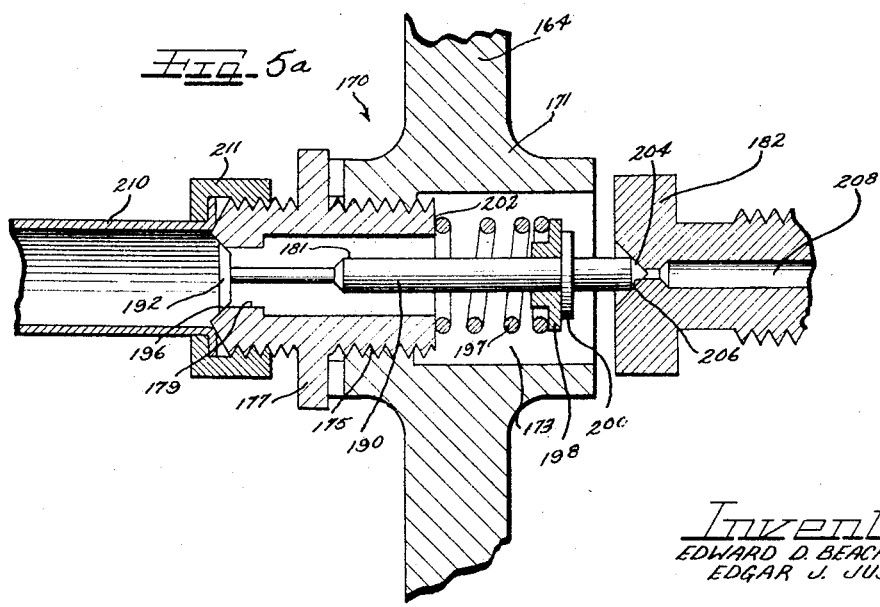

Nov. 10, 1959  E. D. BEACHLER ET AL  2,912,629
AUXILIARY DRIVE CONTROL

Filed Dec. 18, 1956  4 Sheets-Sheet 4

Inventors
EDWARD D. BEACHLER
EDGAR J. JUSTUS
By Hill, Sherman, Meroni, Gross & Simpson
Attys United States Patent Office 2,912,629
Patented Nov. 10, 1959

2,912,629

AUXILIARY DRIVE CONTROL

Edward D. Beachler and Edgar J. Justus, Beloit, Wis., assignors to Beloit Iron Works, Beloit, Wis., a corporation of Wisconsin Application December 18, 1956, Serial No. 629,119

15 Claims. (Cl. 318—6)

This application relates to power drive mechanisms and more particularly to apparatus for controlling the operation of an auxiliary power source.

In particular, this invention is directed to apparatus for coupling to a common load a positive speed drive, in which the torque output does not affect speed, with an auxiliary drive means having a "soft" speed characteristic, i.e., in which an increase in torque demand causes a marked reduction in speed.

A prime object of the invention is to provide a power drive mechanism wherein a main power source is assisted by an auxiliary power source in a manner that the auxiliary power source provides torque to the common load in response to a defined part of the total load.

In machine installations characterized by variations in torque load at particular points, such as machines for handling continuous webs of sheet material, it is important to maintain a constant torque on the web. For example, in a Fourdrinier wire of a paper machine where the main power source is coupled to the oncoming roll, the suction couch roll is commonly coupled to the auxiliary drive. The potential capacity of the suction couch roll to drive the wire increases with an increase in vacuum in its suction chamber. The total driving load, however, increases with an increase in vacuum in the flat suction boxes which extend transversely of the web in longitudinally spaced relation. The degree of vacuum within these boxes is independently controllable and may be varied as desired according to the extent of dewatering required at particular points. Thus, the torque load on the wire varies from time to time and these variations adversely affect control over the tension of the web.

Accordingly, a further object of the invention is to provide a drive mechanism having an auxiliary drive in which the output of the auxiliary drive is controlled by the load requirements of the main drive.

Another object of the invention is to provide a drive mechanism of the stated type in which the output of the auxiliary drive is controlled by reference to the total load measured at the main drive.

A further object of the invention is to provide a drive mechanism of the stated character wherein a constant torque is maintained at all times for proper tensioning of the wire.

A further object of the invention is to provide a drive mechanism for paper machines and the like in which a web or felt passes through the nip of two rolls in rolling contact each with the other, and wherein the effective torque may be varied by means of an auxiliary power source so that tangential shearing forces through the web or felt are precluded.

Another object of the invention is to provide a drive mechanism for paper machines and the like in which an auxiliary power source is provided and in which the effective torque on engaging rolls may be equalized to preclude shearing of the web.

A more particular object of the invention is to provide a power drive mechanism for paper machines and the like having a main power source and an auxiliary power source and means for sensing torque variations in the main power source so that the effective output of the auxiliary power source may be varied accordingly.

Another object of the invention is to provide a drive mechanism of the stated type in which the auxiliary power source takes the form of an electric motor and in which the output of the electric motor may be automatically varied in response to the operation of the sensing means.

These and other objects of the invention will be apparent from time to time as the specification proceeds and with reference to the accompanying drawings wherein:

Figure 1 is a diagrammatic plan view illustrating a drive mechanism embodying the control apparatus of the present invention;

Figure 2 is a diagrammatic elevational view of a Fourdrinier wire of a paper making machine showing the load-varying suction boxes in operative position;

Figure 3 is an elevational sectional view showing a torque sensing device that may be used with the apparatus of Figure 1;

Figure 4 is an elevational sectional view of another form of torque sensing device that may be used with the apparatus of Figure 1;

Figure 5 is a vertical sectional view of still another form of torque sensing device that may be used with the apparatus of Figure 1;

Figure 5a is a greatly enlarged fragmentary sectional view of a detail of Figure 5;

As shown on the drawings:

Figure 6:
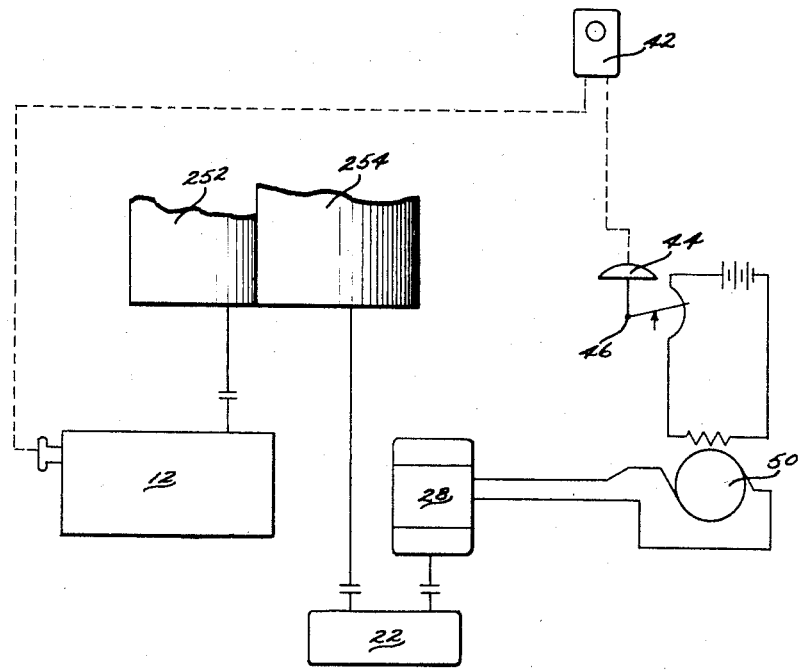
Figure 6 is a diagrammatic plan view illustrating a modified form of drive mechanism in which the auxiliary drive control of the present invention may be embodied.

Referring now to the drawings, the reference numeral 10 indicates an auxiliary drive control made in accordance with the present invention. The auxiliary drive control 10 includes a main drive 12 connected by a shaft 14 to an oncoming roll 16 for driving a Fourdrinier wire 18. A suction couch roll 20, in the present instance, is driven through the medium of a reduction gear 22 and drive shafts 24 and 26 by an auxiliary drive means, which in the embodiment shown takes the form at an electric motor 28. Variations in torque load on the wire 18, because of varying degrees of vacuum in suction boxes 30, 32, 34, 36 and 38, may be measured by a torque measuring or sensing device 40 which develops a varying signal responsive to the torque output of the oncoming roll 16. This signal may be converted in an instrument controller 42 to a control pressure for actuating a diaphragm 44. The diaphragm 44 is shown as operatively connected to a rheostat 46 which controls the voltage across and current through a field coil 48 of an electrical generator 50 which operates the electric motor 28. Thus, the power supplied by the motor 28 is directly controlled by the torque demand on the roll 16.

As pointed out above, the potential capacity of the suction couch roll 20 to drive the wire 18 increases with an increase in vacuum within its suction chamber. Conversely, a decrease in vacuum within the roll 20 will decrease the effectiveness of the couch roll 20 as a driving means. It will be appreciated that a decrease in vacuum within the roll 20 may be accompanied by an increase in vacuum within the several suction boxes 30—38. As a result, as increased torque demand is made of the roll 16 slippage of the wire 18 at the periphery of the roll 20 would be likely to occur. It will be seen that variations in the effectiveness of the roll 20 as a driving means may arise from a variety of causes. The roll 16 is the primary drive for the wire 18 and is helped by the roll 20 when torque demand variations become apparent on the shaft 14. These torque variations may be detected by any one of several types of torque measuring or sensing devices and utilized to control the effectiveness of the motor 28 as required. One form of torque measuring device capable of developing a signal convertible to a positive pressure to operate the diaphragm 44 for actuation of the rheostat 46 will now be described.

Referring now to Figure 3, power may be transmitted from the main drive 12 by means of a gear train 52 having a helical gear 54 mounted on a shaft 56 for driving a helical gear 58 keyed to a shaft 14a. The teeth of the gears 54 and 58 are arranged to afford constant thrust in the shaft 14a in an axial direction away from the roll 16. According to the present invention, the shaft 14a is movable axially a predetermined distance. The thrust developed by the helical gears 54 and 58 tends to move the shaft 14a away from one limit of travel while a counter force is utilized to maintain the shaft in a position intermediate its limits of travel. In the preferred embodiment, the torque sensor 40 comprises a source of fluid pressure for balancing the axial thrust. Variations in torque on the roll 16 produce variations in fluid balancing pressure which affect the output of the auxiliary motor 28 in the manner above set forth.

The outer end of the shaft 14a is journaled in a bearing box 60 having a housing 62 provided with a central bore 64 in which is received a sleeve 66 having at one end an inwardly directed annular flange 68 against which abuts a roller bearing assembly 70, and at the other end an outwardly directed annular flange 72. The roller bearing assembly 70 journals the outer end of the shaft 14a and is retained in position by a bell housing 74 having an outwardly directed annular flange 76 provided with a plurality of circumferentially spaced openings for reception of cap screws 78 which pass through corresponding openings in the flange 72 and are threadedly received in the housing 62. The flange 76 is spaced from the inner end of the bell housing 74 so as to define a free edge 80 which abuts against the roller bearing assembly 70 to retain it in the position shown. The outer end of the shaft 14a is provided with a reduced portion 82 forming a shoulder 84 against which abuts a piston 86 which divides the interior of the bell housing 74 into a chamber 88 and a chamber 90.

In operation, a suitable fluid under pressure, such as lubricating oil or the like, may be introduced into the chamber 88 through a pressure line 92. The pressure of this fluid may readily be controlled by a choke valve 94 to maintain sufficient pressure within the chamber 88 to force the piston 86, and the shaft 14a, into an equilibrium position in opposition to the thrust of the shaft 14 developed by the gear train 52. A predetermined quantity of fluid is normally permitted to escape from the chamber 88 to the chamber 90 through an axial passage 96 formed in the free end of the shaft 14a and communicating with a plurality of radially extending ports 98. From the chamber 90 the fluid may pass back to a sump (not shown) through a passage 100, or may be directed elsewhere for lubrication purposes, if desired.

As pointed out above, the normal fluid pressure maintained within the chamber 88 is sufficient to maintain the piston 86 on the shaft 14a in an equilibrium position. In the event, however, that the axial thrust of the shaft 14a exceeds a predetermined amount, due to an increase in torque on the roll 16, for instance, the shaft 14a is forced to the left, as viewed in Figure 3, so that the axial passage 96 is blocked by a cap screw 102 with the result that the pressure within the chamber 88 increases and this pressure rise may be transmitted by means of a pressure line 104 to the controller 42 for selective operation of the rheostat 46, through the medium of the diaphragm 44, to vary the output of the auxiliary motor 28.

The cap screw 102 is threadedly received in a central boss 106 formed in the bell housing 74. By this arrangement, the cap screw 102 may be adjustably positioned to vary the position at which passage of fluid into the chamber 90 is terminated. It will be appreciated that the adjustability of the cap screw 102 provides any desired degree of sensitivity to the present torque sensing device so that the device may become operative to control the effective output of the auxiliary motor 28 upon any increment of movement as a result of axial thrust of the shaft 14a beyond the predetermined equilibrium position. The cap screw 102 may be fixed in any desired position by a jam nut 108. A cap 110 may be removably secured to the bell housing 74 to enclose the cap screw 102.

Upon a predetermined pressure rise within the chamber 88, the piston 86 is forced to the right, as viewed in Figure 3, so that the passages 96 and 98 are again opened and pressure within the chamber 88 drops to or levels off at the level required to maintain the shaft 14a in equilibrium position.

Referring now to Figure 4, there is shown in that figure another form of torque sensing device, indicated generally by reference numeral 40a, which may be employed to control the operation of the auxiliary motor 28. In this form of the invention, the shaft of the roll 16 is indicated by a reference numeral 14b and is journalled in a bearing assembly 60a having a housing 62a provided with a central bore 64a. The housing 62a has at one end an inwardly extending flange 68a against which abuts a ball bearing 70a. The shaft 14b is provided at its outer end with a thrust bearing assembly 112 having an inner race 114 affixed to the shaft 14b and an outer race 116 spaced from the inner race 114 by a plurality of rollers 118. To the outer race 116 is secured a cap 120 formed integrally with an outwardly extending rod 122 pivotally connected at 124 to a lever 126 which is fulcrumed at 128. To the other end of the lever 126 is pivotally connected a connecting rod 130. The connecting rod 130 is pivotally secured in a conventional manner to a piston 132 which is slidably received in a fixed cylinder 134. One end of the cylinder 134 is closed so that the slidable piston 132 defines a chamber 136 into which fluid under pressure may be introduced through a pressure line 138. The fluid pressure may be reduced and controlled as desired by a control or choke valve 140 to urge the piston 132 to the position shown. A bleed port 142 is provided in the wall of the cylinder 134 for normal passage of a predetermined amount of the pressure fluid back to sump (not shown). The port 142 is preferably restricted to afford a predetermined pressure within the chamber 136 so that the piston 132 is normally maintained in the position indicated. In the event of increased axial thrust in the shaft 14b, to the left, as viewed in Figure 4, the lever 126 is pivoted in a counterclockwise direction and the rod 130 and the piston 132 are moved to the right to cover the port 142 and the resulting pressure buildup is transmitted to the controller 42 by means of a pressure line 144. When the thrust on the shaft 14b is reduced, the fluid pressure within the chamber 136 forces the piston 132 to the left, the lever 126 is rotated in a clockwise direction, the cap 120 follows the shaft 14b to the right, and the passage 142 is uncovered to terminate the shaft movement at an equilibrium position.

In Figure 5 is shown a modified form of torque sensing device that may be employed in the arrangement of Figure 1. In this form of the invention, the roll 16 has a shaft 14c on which the helical gear 58 is keyed. The gear 58 is driven by the main drive 12 through the shaft 56 and the helical gear 54 as in the forms of the invention shown in Figures 3 and 4. In this instance, however, a torque sensor 40b is positioned on the outer end of the shaft 14c. A bearing box 148 supports the outer end of the shaft and is provided with a roller bearing assembly 150 mounted on a reduced shaft portion 152. The sensing device 40b includes a housing 154 which is flared at 156 and has an annular flange 158 retained in position by circumferentially spaced spider arms 159, thus providing free communication between the interior of the housing 154 and the atmosphere. The flange 158 is secured by means of a plurality of circumferentially arranged bolts 160 to an annular flange 162 forming a part of a housing 164. Between the confronting faces of the flanges 158 and 162 is clamped the marginal edge of a flexible impervious diaphragm 166. Fluid under pressure such as air or the like may be introduced into a chamber 168, defined by the housing 164 and the diaphragm 166, through a relay poppet valve 170. This fluid pressure tends to urge the axially movable shaft 14c to the right, as viewed in Figure 5, to an equilibrium position intermediate its axial limits of travel. To this end, the shaft 14c has a further reduced portion 172 to the outer end of which is secured a thrust bearing assembly 174. A cap 176 is mounted on the thrust bearing assembly 174 in abutment with the outer end of the shaft 14c and has a shaft 178 extending axially therefrom. The shaft 178 has a threaded bore 180. Connected to the outer end of the shaft 178 by means of a cap screw 182 is a disc 184 which is engaged by the diaphragm 166 for movement of the shaft 14c to the right as viewed in Figure 5, in response to fluid pressure within the chamber 168.

As pointed out above, the fluid pressure on the diaphragm 166 may move the shaft 14c only to an equilibrium position intermediate its limits of axial travel. To this end, means are provided for admitting sufficient fluid into the chamber 168 to maintain this position and for reducing the pressure within the chamber 168 in the event that a decrease in axial thrust tends to urge the shaft 14c to the right, as viewed in Figures 5 and 5a. In the latter event, the fluid within the chamber 168 is exhausted to return the shaft 14c to the equilibrium position.

The poppet valve 170 serves a dual function in that it not only controls the admission of air into the chamber 168, but also controls exhausting of air therefrom, as required. Referring now more particularly to Figure 5a, the housing 164 has a boss 171 provided with a recess 173 and a threaded bore 175 communicating with the recess 173. A valve body 177 has a bore 179 communicating with a counter bore 181. Mounted axially within the bores 179 and 181 is a valve stem 190 which is provided at one end with a head 192 formed with a substantially frusto-conical surface 194 for engaging a correspondingly formed seat 196 at the left end of the valve body 177. The head 192 is normally retained in the position shown by means of a compression spring 197 which abuts at one end against a retainer ring 198 held in position by a snap ring 200, and at the other end by an outwardly extending annular flange 202 formed integrally with the valve body 177. At the right end of the stem 190, as viewed in Figure 5a, is formed a conical head 204 which in the equilibrium position shown rests against a conical seat 206 formed in the head of the cap screw 182. Communicating with the seat 206 is a passage 208 formed centrally of the cap screw 182 and joining the bore 180 of the shaft 178.

In normal operation, sufficient air pressure is maintained in the chamber 168 to hold the shaft 14c in an equilibrium position intermediate its axial limits of travel. Upon an increase in torque the thrust therefrom acts to move the shaft 14c, along with its associated parts, to the left against the resisting force on the diaphragm 166. The valve stem 190, being in contact with the cap screw 182, also moves to the left to lift the head 192 of the stem 190 from the seat 196, and thus air is admitted from a supply conduit 210 which is secured in sealing relation to the valve body 177 by means of a nut 211. The air passes through an annular passage surrounding the stem 190, and thence into the chamber 168, until the pressure in the chamber equals or slightly exceeds the thrust due to the increase in torque. This slight increase in pressure reverses the movement of the shaft 14c to restore the shaft to its equilibrium position. Pressure variations within the chamber 168 may be transmitted to the controller 42 through a pressure line 250.

Again assuming the shaft to be in the equilibrium position shown, a decrease in torque on the shaft 14c brings about a condition in which the axial thrust on the shaft is insufficient to balance the pressure on the diaphragm 166. As a result, the shaft 14c and its associated parts including the cap screw 182, move to the right. Since the valve stem 190 cannot move further to the right because the head 192 seats on the seat 196, the cap screw 182 is moved away from the head 204 of the stem 190 and the passage 208 is opened to provide communication between the chamber 168 and the atmosphere through a drilled passage 213 which joins the bore 180 with the interior of the housing 154.

Upon subsequent movement of the shaft 14c to the left in response to axial thrust developed by the helical gear train and the roll 16, the head 204 of the stem 190 of the poppet valve 170 is again seated on the conical seat 206 and exhausting of air in the manner described is prevented. Since the air pressure in the chamber 168 is reduced, the cap screw 182 is free to urge the stem 190 to the left to unseat the head 192 and admit additional air. Sufficient air is admitted to return the shaft 14c to the equilibrium position.

The point at which the cap screw 182 becomes effective to unseat the head 192 may be varied by adjusting the position of the cap screw within the bore 180. For instance, unscrewing the cap screw 182 advances the opening of the valve for admission of additional air, and rotation of the cap screw 182 in the opposite direction retards the unseating of the head 192. Thus, the poppet valve 170 is instantaneously responsive to axial thrust variations. When the thrust increases, air is admitted into the chamber 168 to increase the pressure within the chamber sufficiently to balance the increment of thrust. When the thrust decreases, the normal air pressure within the chamber 168, acting against the diaphragm 166, is sufficient to move the cap screw 182 to the right so that the head 204 of the stem 190 is unseated and the air within the chamber exhausts to atmosphere. When the pressure in the chamber 168 is thus reduced, the thrust is sufficient again to urge the cap screw to the left so that the passage 208 is closed and the head 192 of the stem 190 is unseated for the introduction of additional air.

Figure 7:
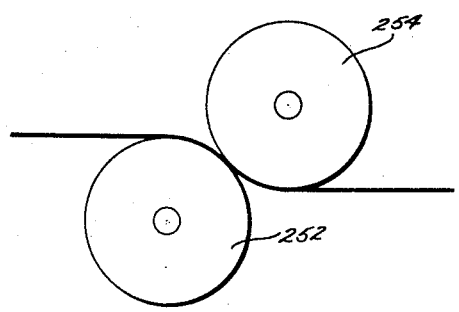
Figure 7 is a diagrammatic elevational view showing the driven rolls of Figure 6 and their relationship to a web traveling therebetween.

In Figure 6 is shown the auxiliary drive control of the present invention as applied to press rolls 252 and 254. The roll 252 is shown as driven by the main drive 12 and the roll 254 is illustrated as being driven by the electric motor 28 through the reduction gear 22. Torque load variations are detected by a torque sensor that may assume the form shown in Figures 3, 4 or 5 and are transmitted to the controller 42 for actuation of the diaphragm 44 to control the operation of the rheostat 46. The position of the rheostat 46 may be varied to control the output of the generator 50, as in the form of the invention shown in Figure 1. Referring briefly to Figure 7 in which a web or felt is shown as passing through the nip of the rolls 252 and 254 it is apparent that should the torque applied to the respective rolls vary, a tangential shearing force would be applied through the web or felt. According to the present invention, however, the torque developed in the roll 254 exactly parallels the torque developed in the roll 252 at all times, and such a shearing force cannot develop.

From the foregoing it will be readily observed that there is provided in accordance with this invention a greatly improved and simplified auxiliary control system and that numerous variations and modifications may be effected without departing from the true spirit and scope of the novel concepts and principles of this invention. We therefore, intend to cover all such modifications and variations as fall within the true spirit and scope of the novel concepts and principles of this invention.

We claim as our invention:

1. In a drive mechanism for a machine characterized by variations in torque load and having a driven element, an axially movable driving element connected to a main power source, the improvement comprising means for maintaining constant torque on said driven element despite variations in torque load, said means including an auxiliary power source, means for detecting torque load variations of said driven element, said last named means including a fluid chamber defined in part by a slidable piston, said piston being operative upon actuation by fluid received in said chamber to urge said driving element axially into an equilibrium position intermediate the travel limits thereof in opposition to axial thrust of said driving element, said driving element being movable from said equilibrium position by variations in thrust so that the fluid pressure fluctuates, and means actuatable in response to departure of said element from the equilibrium position for selectively varying the output of said auxiliary power source whereby constant torque is maintained on said driven element.

2. In a drive mechanism for a machine characterized by variations in torque load and having a driven element, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a slidable piston, said piston being operative upon actuation by fluid received in said chamber to urge said driving element axially into an equilibrium position intermediate the travel limits thereof in opposition to axial thrust of said driving element, sad driving element being movable from said equilibrium position by variations in thrust so that the fluid pressure fluctuates, means actuatable in response to departure of said element from the equilibrium position for selectively varying the output of said auxiliary power source whereby constant torque is maintained on said driven element, said auxiliary power source including an electric motor, said last-named means including a generator for supplying current to said electric motor, and a controller operable in response to fluid pressure fluctuations to vary the current supplied to said electric motor.

3. In a drive mechanism for a machine characterized by variations in torque load and having a driven element, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a slidable piston, a connecting rod pivotally connected to said piston, said piston being operative upon actuation by fluid received in said chamber to urge said driving element axially into an equilibrium position intermediate the travel limits thereof in opposition to axial thrust, means operative in response to fluctuations in axial thrust for actuating said connecting rod and said piston so that the pressure of the fluid within said chamber fluctuates accordingly, and means actuatable in response to departure of said element from the equilibrium position for selectively varying the output of said auxiliary power source whereby constant torque is maintained on said driven element.

4. In a drive mechanism for a machine characterized by variations in torque load and having a driven element, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a slidable piston, a connecting rod pivotally connected to said piston, said piston being operative upon actuation by fluid received in said chamber to urge said driving element axially into an equilibrium position intermediate the travel limits thereof in opposition to axial thrust, means operative in response to fluctuations in axial thrust for actuating said connecting rod and said piston so that the pressure of the fluid within said chamber fluctuates accordingly, and means actuatable in response to fluid pressure fluctuations for varying the output of said auxiliary power source so that constant torque is maintained on said driven element, and means actuatable in response to departure of said element from the equilibrium position for selectively varying the output of said auxiliary power source whereby constant torque is maintained on said driven element.

5. In a drive mechanism for a machine characterized by variations in torque load and having a driven element, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a slidable piston, said piston being operative upon actuation by fluid received in said chamber to urge said driving element axially into an equilibrium position intermediate the travel limits thereof in opposition to axial thrust, means operative in response to fluctuations in axial thrust for actuating said piston so that the pressure of the fluid within said chamber fluctuates accordingly, and means actuatable in response to departure of said element from the equilibrium position for selectively varying the output of said auxiliary power source whereby constant torque is maintained on said driven element.

6. In a drive mechanism for a machine characterized by variations in torque load and having a driven element, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a slidable piston, said piston being operative upon actuation by fluid received in said chamber to urge said driving element axially into an equilibrium position intermediate the travel limits thereof in opposition to axial thrust for actuating said piston so that the pressure of the fluid within said chamber fluctuates accordingly, and means actuatable in response to fluid pressure fluctuations for varying the output of said auxiliary power source so that constant torque is maintained on said driven element.

7. In a drive mechanism for a machine characterized by variations in torque load and having a driven element, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a slidable piston, a connecting rod pivotally connected to said piston, said piston being operative upon actuation by fluid received in said chamber to urge said driving element axially into an equilibrium position intermediate the travel limits thereof in opposition to axial thrust, means operative in response to fluctuations in axial thrust for actuating said connecting rod and said piston so that the pressure of the fluid within said chamber fluctuates accordingly, means actuatable in response to departure of said element from the equilibrium position for selectively varying the output of said auxiliary power source whereby constant torque is maintained on said driven element, said auxiliary power source including an electric motor, said last-named means including a generator for supplying current to said electric motor, and a controller operable in response to fluid pressure fluctuations to vary the current supplied to said electric motor.

8. In a drive mechanism for a machine having a driven element characterized by variations in torque load, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by an impervious flexible diaphragm, said diaphragm being operative upon actuation by fluid received in said chamber to urge said driving element axially into an equilibrium position intermediate the travel limits thereof in opposition to axial thrust, means operative in response to fluctuations in axial thrust for actuating said diaphragm so that the pressure of the fluid within said chamber fluctuates accordingly, and means actuatable in response to departure of said element from the equilibrium position for selectively varying the output of said auxiliary power source whereby constant torque is maintained on said driven element.

9. In a drive mechanism for a machine having a driven element characterized by variations in torque load, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a flexible impervious diaphragm, said diaphragm being operative upon actuation by fluid received in said chamber to urge said driving element axially into an equilibrium position intermediate the travel limits thereof in opposition to axial thrust, means operative in response to fluctuations in axial thrust for actuating said diaphragm so that the pressure of the fluid within said chamber fluctuates accordingly, and means actuatable in response to fluid pressure fluctuations for varying the output of said auxiliary power source so that constant torque is maintained on said driven element.

10. In a drive mechanism for a machine having a driven element characterized by variations in torque load, an axially movable driving element connected to a main power source, the improvement comprising means for maintaining constant torque on said driven element despite variations in torque load, said means including an auxiliary power source, means for detecting torque load variations of said driven element, said last-named means including a fluid chamber defined in part by a flexible impervious diaphragm, said diaphragm being operative upon actuation by fluid received in said chamber to urge said driving element axially into an equilibrium position intermediate the travel limits thereof in opposition to axial thrust, means operative in response to fluctuations in axial thrust for actuating said diaphragm so that the pressure of the fluid within said chamber fluctuates accordingly, means actuatable in response to departure of said element from the equilibrium position for selectively varying the output of said auxiliary power source whereby constant torque is maintained on said driven element, said auxiliary power source including an electric motor, said last-named means including a generator for supplying current to said electric motor, and a controller operable in response to fluid pressure fluctuations to vary the current supply to said electric motor.

11. A driving mechanism for a paper making machine having an endless Fourdrinier wire, a first element for driving said wire, said first element being axially movable within predetermined limits, said first element being connected to a main power source, a second element for driving said wire, said second element being connected to an auxiliary power source, means for coordinating the output of said auxiliary power source with the torque demands of said first element, said means comprising means for detecting axial thrust fluctuations of said first element as a measure of torque demand, said last-named means including a fluid pressure chamber defined in part by a flexible impervious diaphragm for urging said first element into a position intermediate the limits of axial travel thereof in opposition to axial thrust so that thrust fluctuations produce corresponding fluid pressure fluctuations, and means responsive to fluid pressure fluctuations for varying the output of said auxiliary power source accordingly.

12. A driving mechanism for a paper making machine having an endless Fourdrinier wire, a first element for driving said wire, said first element being axially movable within predetermined limits, said first element being connected to a main power source, a second element for driving said wire, said second element being connected to an auxiliary power source, said auxiliary power source including an electric motor, means for coordinating the output of said auxiliary power source with the torque demands of said first element, said means comprising means for detecting axial thrust fluctuations of said first element as a measure of torque demand, said last-named means including a fluid pressure chamber defined in part by a flexible impervious diaphragm for urging said first element into a position intermediate the limits of axial travel thereof in opposition to axial thrust so that thrust fluctuations produce corresponding fluid pressure fluctuations, and means responsive to fluid pressure fluctuations for varying the output of said auxiliary power source accordingly, said last-named means including a generator for supplying current to said motor, a rheostat for controlling the output of said generator and a controller operative by a pressure signal from said chamber to adjust the position of said rheostat.

13. A drive mechanism for a machine characterized by variations in torque load and having a driven element, including in combination: a first driving element axially movable within predetermined limits in response to torque applied thereto and adapted to be connected to a main power source for being rotatably driven thereby; a second driving element and an auxiliary power source jointly coacting with the main power source to rotatably drive the driven element; sensing means responsive to axial thrust of said first driving element; and means actuatable by said sensing means for proportionately varying the output of said auxiliary power source in response to the thrust variations of said first driving element; whereby substantially constant input torque is maintained on said first driving element despite variations in torque load.

14. A drive mechanism for a machine characterized by variations in torque load and having a driven element, including in combination: a first driving element axially movable within predetermined limits in response to torque applied thereto and adapted to be connected to a main power source for being rotatably driven thereby; a second driving element and an auxiliary power source jointly coacting with the main power source to rotatably drive the driven element; sensing means responsive to axial thrust of said first driving element, said means including a source of pressurized fluid for urging said rotatably driven driving element axially into an equilibrium position intermediate said limits in opposition to the axial thrust of said first driving element; and means actuatable in response to axial departure of said first driving element from said equilibrium position for proportionately varying the output of said auxiliary power source, and phased to maintain substantially constant input torque on said first driving element despite variations in torque load.

15. A drive mechanism for a paper making machine having an endless Fourdrinier wire, including in combination: a first rotatable driving element for driving said wire, said element being axially movable within predetermined limits in response to both input torque and torque load applied thereto, said first driving element being adapted to be connected to a main power source; a second rotatable driving element for also driving said wire, and being adapted to be connected to an auxiliary power source; sensing means for detecting axial thrust fluctuations of said first driving element, said sensing means including a fluid pressure chamber defined in part by a movable element operatively connected to said first driving element for urging said first driving element into a position intermediate said predetermined limits of axial travel thereof in opposition to axial thrust and so that axial thrust fluctuations produce corresponding fluid pressure variations; and means responsive to fluid pressure fluctuations in said chamber for varying the output of the auxiliary power source accordingly.

References Cited in the file of this patent

UNITED STATES PATENTS

| | | |
|---|---|---|
| 1,951,225 | Weiske et al. | Mar. 13, 1934 |
| 2,424,321 | King | July 22, 1947 |
| 2,445,416 | Baker et al. | July 20, 1948 |